Patented Apr. 19, 1949

2,467,439

UNITED STATES PATENT OFFICE 2,467,439

THIOPHENE COMPOUNDS

Blaine Chase McKusick, Wilmington, Del., assignor to E. I. du Pont de Nemours & Company, Wilmington, Del., a corporation of Delaware No Drawing. Application July 5, 1947, Serial No. 759,297

8 Claims. (Cl. 260—329)

This invention relates to organic heterocyclic compounds, and more particularly to derivatives of 2,2′-methylenedithiophene.

This invention has as an object the provision of new and useful derivatives of 2,2′-methylenedithiophene. Another object is to provide convenient methods of preparing these new heterocyclic compounds. A further object is to provide chemical compounds useful as dyes, intermediates for photographic sensitizers and intermediates for condensation polymers and other chemical syntheses. Other objects will appear hereinafter.

These objects are accomplished by the invention of 2,2′-alkylidenebis-(5-acylthiophenes) of the general formula

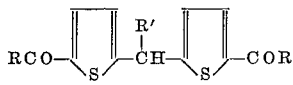

where R is a hydrocarbon radical, preferably of not more than six carbons and still more preferably alkyl, and R′ is hydrogen or an alkyl radical of not more than six carbons, their oxidation products containing a dithienyl ketone nucleus and processes for preparing the products of this invention by acylating 2,2′-alkylidenedithiophene and particularly 2,2′-methylenedithiophene and oxidizing the 2,2′-methylenebis-(5-acylthiophenes) to the 2,2′-dithienylketones having a carbonyl substituent (acyl or carboxyl) on the 5 positions of each thiophene nucleus. The 2,2′-methylenebis-(5-acylthiophenes), i. e. the compounds of the formula above where R′ is hydrogen, may be oxidized to dithienylketones which, depending upon the oxidation conditions, are either 2,2′-carbonylbis-(5-acylthiophenes) of the formula

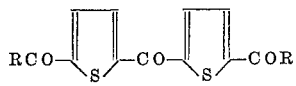

where R is as above or 2,2′-carbonylbis-(5-thiophenecarboxylic acids),

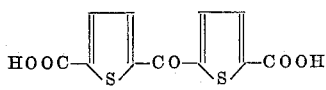

In the cases where R′ is alkyl the oxidation takes place readily but the end products are not the same as when R′ is H.

The more detailed practice of the invention is illustrated in the following examples where parts given are by weight. The invention is for convenience illustrated in its application to 2,2′-methylenedithiophene which may be obtained by methods described in the literature (Peter, Ber., 17, 1345 (1884); Blicke and Burkhalter, J. Am. Chem. Soc., 64, 477 (1942); and to 2,2′-ethylidenedithiophene, which may be obtained by the method of Nahke, Ber., 30, 2037 (1897)). There are of course many forms of the invention other than these specific embodiments as is indicated below.

Example I

A solution of 72 parts of 2,2′-methylenedithiophene in 129 parts (50% excess) of 95% acetic anhydride was stirred and heated to 100° C. while a solution of 1.8 parts of iodine in 7 parts of ether was added over a period of 30 minutes to serve as acylation catalyst. Following this, the solution was heated and stirred 90 minutes longer, then treated slowly with a solution of 1.1 parts of sodium bisulfite in 25 parts of water to remove the iodine. The mixture was then cooled and the reaction product was taken up in 300 parts of chloroform. The chloroform extract was washed successively with water, 10% sodium hydroxide, water and then dried. The chloroform was removed by flash distillation at water-pump vacuum from a pot at 140° C., and the residue was distilled through a stillhead of short path and wide bore. The bulk of the product distilled at 176–184° at 0.1 mm. pressure. Two distillations followed by two recrystallizations from ethanol gave 50 parts (46% yield) of pure 2,2′-methylenebis-(5-acetylthiophene), obtained as white needles melting at 124–125° C.

Analysis: Calculated for $C_{13}H_{12}O_2S_2$: C, 59.1; H, 4.6; S, 24.3. Found: C, 59.1, 59.1; H, 4.5, 4.7; S, 23.8, 24.0.

2,2′-methylenebis-(5-acetylthiophene) is insoluble in hot ether or hexane and sparingly soluble in most solvents at room temperature. The best solvents are chloroform and dioxane. A trace of a strong base such as sodium hydroxide or potassium hydroxide causes an alcohol solution of the diketone to turn deep blue, the mechanism probably being enolization to a mixture of resonance structures. Weaker bases such as sodium carbonate, pyridine, and ammonia do not produce a blue color. The blue color is stable under an inert atmosphere, but oxygen rapidly attacks the central methylene group and discharges the blue color with formation of 2,2′-carbonylbis-(5-acetylthiophene), as described in more detail in Example III below.

Instead of using an acid anhydride with iodine as the catalyst to acylate 2,2′-methylenedithiophene, other agents may be used as shown in the following example.

Example II

A solution of 16.5 parts (0.092) mole of 2,2'-methylenedithiophene and 21.6 parts (0.28 mole) of acetyl chloride in 88 parts of thiophene-free benzene was maintained below 10° C. at 73 parts (0.28 mole) of stannic chloride was added in the course of 40 minutes. The mixture was stirred an additional 60 minutes at room temperature and was then treated with 18 parts of concentrated hydrochloric acid in 120 parts of water. The organic layer was washed with water and the benzene was removed by distillation at reduced pressure. The dark brown residue solidified on being cooled to room temperature. It was not readily amenable to crystallization but was purified by vacuum sublimation followed by recrystallization from a mixture of ethyl acetate and hexane, giving white needles of 2,2'-methylenebis-(5-acetylthiophene), M. P. 124–125° C. For many purposes the crude reaction product does not require purification.

Example III

Eight (8) parts of 2,2'-methylenebis-(5-acetylthiophene) was dissolved in 1000 parts of hot 95% alcohol and the solution was cooled to room temperature. A solution of 0.4 part of potassium hydroxide in 0.4 part of water was added, whereupon the diketone solution turned deep blue. When a stream of oxygen was passed thru the stirred solution, the blue color disappeared in the course of 30 minutes and fine yellow crystals precipitated. The precipitate was filtered and recrystallized twice from 1200 parts of acetic acid. There was thus obtained 7.3 parts (88% yield) of a product which analysis and molecular weight determination showed to be 2,2'-carbonylbis-(5-acetylthiophene). The structure of the product was further established by quantitative determination of the oxygen absorbed, which showed that one mole of oxygen reacted with one mole of 2,2'-methylenebis-(5 - acetylthiophene), as required by the theory.

Analysis: Calculated for $C_{13}H_{10}O_3S_2$: C, 56.1; H, 3.5; S, 23.0; molecular weight, 278. Found: C, 56.55, 56.3; H, 3.75, 3.8; S, 23.0, 23.2; molecular weight (ebullioscopic in acetic acid), 286, 285.

2,2'-carbonylbis-(5-acetylthiophene) has the appearance of flat needles of a pale yellow color. The crystals melt at 262–263° C. after softening around 242° C. Acetic acid and dioxane are the only solvents found in which the compound is appreciably soluble even in the hot.

In the oxidation experiment just described air can replace oxygen. However, hydrogen peroxide is ineffective, probably because of its acidic reaction. In the absence of alkali, neither air nor oxygen has any effect. Solvents such as methanol, pyridine, and dioxane can be substituted for ethanol.

The central methylene group of 2,2'-methylenebis-(5-acetylthiophene) may also be oxidized to a carbonyl group, without affecting the acyl groups, by means of chromic oxide in acid medium, as shown by the following example.

Example IV

To a solution of 5 parts of 2,2'-methylenebis-(5-acetylthiophene) in 260 parts of acetic acid at 100° C. was added dropwise with stirring 13.2 parts of chromic oxide in 13 parts of water. This was sufficient chromic oxide to oxidize not only the methylene group to a carbonyl group, but both acetyl groups to carboxyl groups as well. However, the product of the reaction was 2,2'-carbonylbis-(5-acetylthiophene). It was isolated by diluting the reaction mixture with 750 parts of water and filtering. After recrystallization from acetic acid there was obtained 3.6 parts (68% yield) of 2,2'-carbonylbis-(5 - acetylthiophene) identified by its melting point and mixed melting point with an authentic sample.

Under different conditions, however, 2,2'-methylenebis-(5-acetylthiophene) will oxidize at the three points of attack, i. e., the central methylene group and both acyl groups, as shown by the following example.

Example V

A solution of 5.3 parts (0.02 mole) of 2,2'-methylenebis-(5-acetylthiophene) in 37 parts of chloroform was stirred at 60° C. for 56 hours with 150 parts of an alkaline 1.2 molar sodium hypochlorite solution. At the end of this time a test with acidified potassium iodide solution showed the absence of active chlorine. The reaction product was the sodium salt of 2,2'-carbonylbis-(5-thiophenecarboxylic acid), which is sparingly soluble in sodium chloride solution and had therefore precipitated from the reaction mixture. It was filtered and washed with chloroform. From the chloroform extract was recovered on evaporation 2.7 parts of unchanged starting material. The sodium salt of the acid was dissolved in hot water, the solution was filtered and the filtrate treated with hydrochloric acid, which precipitated the free 2,2'-carbonylbis-(5-thiophenecarboxylic acid), of which there was obtained 1.15 parts (21% gross yield, 41% yield based on the unrecovered starting material).

2,2'-carbonylbis-(5 - thiophenecarboxylic acid) is insoluble in all the usual solvents and melts above 300° C. It may be purified by dissolving it in a slight excess of sodium carbonate solution and reprecipitating it with hydrochloric acid.

Analysis: Calculated for $C_{11}H_6O_5S_2$: C, 46.8; H, 2.1; S, 22.7; neutralization equivalent 141. Found: C, 46.6, 46.5; H, 2.1, 2.2; S, 22.4, 22.5; neutralization equivalent 149.150.

It is noteworthy that 2,2'-methylenedithiophene is not oxidized under the conditions of the above example. Apparently, the sensitivity to oxidation of 2,2'-methylenebis-(5-acetylthiophene) is due to the activating effect of the two acyl groups.

Example VI

Using the procedure described in Example I, there was obtained from 38.8 parts of 2,2'-ethylidenedithiophene, 65 parts of acetic anhydride and 0.9 part of iodine a yield of 34 parts of once-distilled 2,2'-ethylidenebis-(5 - acetylthiophene), B. P. 190–220° C. at 0.5 mm. pressure. After recrystallization from 50 parts of absolute ethanol the product (28.1 parts, yield 51%) melted at 62.5–64° C.

Analysis: Calculated for $C_{14}H_{14}O_2S_2$: C, 60.4; H, 5.1; S, 23.0. Found: C, 59.6; H, 5.3; S, 22.6.

2,2'-ethylidenebis-(5-acetylthiophene) gives a dark blue color when dissolved in absolute ethanol containing a drop of potassium hydroxide. The color is soon discharged when oxygen is bubbled through the solution, but it is regenerated by addition of more alkali.

This invention includes as new products the 2,2'-methylenebis - (5 - acylthiophenes) wherein the acyl group is that of any organic monobasic carboxylic acid including propionic, butyric, isobutyric, hexanoic, dodecanoic, benzoic, phenylacetic, cyclohexanecarboxylic acids, etc. Preferably, the non-carbonyl part of the acyl group is a hydrocarbon radical of not more than six carbons and still more preferably it is an alkyl radical of not more than six carbon atoms. The central methylene group may be substituted, preferably by an alkyl radical of not more than six carbons, e. g., methyl, ethyl, hexyl, etc., and the thiophene nuclei may be substituted in the 3 and/or 4 positions. The invention includes not only these 2,2'-alkylidenebis-(5-acylthiophenes), i. e. heterocyclic compounds wherein two thiophene nuclei are joined, at the 2 and 2' positions respectively, by an alkylidene radical of one to six carbons having at least one hydrogen on the carbon directly attached to the thiophene nuclei and wherein the two thiophene nuclei are each substituted in the 5 position by the acyl radical of an organic carboxylic monobasic acid, but also the 2,2'-carbonylbis-(5-acylthiophenes) and 2,2'-carbonylbis-(5-thiophenecarboxylic acid).

The 2,2'-alkylidenebis-(5-acylthiophenes) may be prepared by treatment of 2,2'-methylenedithiophene with acid anhydrides or acyl halides in the presence of catalysts or condensing agents of the Friedel-Crafts type such as aluminum chloride, stannic chloride, phosphoric acid and iodine. Variations in the procedures described herein will readily suggest themselves to the experimenter. The invention also includes as new products the oxidation products, having a dithienylketone nucleus, of the 2,2'-methylenebis-(5-acylthiophenes), i. e., the 2,2'-carbonylbis-(5-acylthiophenes) having acyl groups of the type discussed above, and the 2,2'-carbonylbis-(5-thiophenecarboxylic acids).

Oxidation of the 2,2'-methylenebis-(5-acylthiophenes) may be carried out according to the methods described as variations thereof. Depending upon the procedural conditions, oxidation may lead either to the 2,2'-carbonylbis-(5-acylthiophenes) or to the 2,2'-carbonylbis-(5-thiophenecarboxylic acids). The former products are generally obtained under mild conditions, e. g., oxygen oxidation in the presence of a strong base, while the latter products are obtained under more drastic conditions such as treatment with an alkali hypohalite or with chlorine in an aqueous alkaline medium.

The 2,2'-methylenebis-(5-acylthiophenes) are useful as dyes and intermediates for photographic sensitizers. The 2,2'-carbonylbis-(5-thiophenecarboxylic acids) are intermediates for condensation polymers. All three classes of compounds described herein are valuable intermediates in chemical syntheses through their active methylene, keto and/or carboxyl groups.

The foregoing detailed description has been given for clearness of understanding only and no unnecessary limitations are to be understood therefrom. The invention is not limited to the exact details shown and described for obvious modifications will occur to those skilled in the art.

What is claimed is:

1. 2,2'-methylenebis-(5-acetylthiophene).
2. 2,2'-carbonylbis-(5-acetylthiophene).
3. 2,2'-carbonylbis-(5-carboxythiophene).
4. A 2,2'-methylenebis-(5-acylthiophene).
5. A 2,2'-carbonylbis-(5-acylthiophene).
6. A 2,2' - methylenebis - (5 - acylthiophene) wherein the central methylene group may have an alkyl substituent of up to six carbons.
7. A 2,2' - alkylidenebis - (5 - acylthiophene) wherein the alkylidene radical is of one to seven carbons and has at least one hydrogen on the carbon joining the thiophene nuclei.
8. A heterocyclic compound having two monocyclic thiophene nuclei joined at the 2 position through a single carbon atom and having on the 5 position a carbonyl group, said compound further being selected from the class consisting of 2,2'-alkylidenebis-(5-acylthiophene) where the alkylidene radical is one to seven carbons and has hydrogen on the carbon joining the thiophene nuclei, 2,2' - carbonylbis - (5 - acylthiophenes) and 2,2'-carbonylbis-(5-thiophenecarboxylic acid) said heterocyclic compounds having on the monocyclic thiophene nuclei only the recited substituents.

BLAINE CHASE McKUSICK.

REFERENCES CITED

The following references are of record in the file of this patent:

FOREIGN PATENTS

| Number | Country | Date |
|---|---|---|
| 504,248 | Germany | Aug. 12, 1930 |